Patented Aug. 6, 1935

2,010,039

UNITED STATES PATENT OFFICE 2,010,039

CHLORINATED HYDROCARBONS AND PROCESS OF MANUFACTURE

William E. Sharp, Chicago, Ill.; Minnie E. Sharp executrix of the estate of said William E. Sharp, deceased No Drawing. Original application September 8, 1931, Serial No. 561,817. Divided and this application April 23, 1932, Serial No. 607,230

13 Claims. (Cl. 260—166)

This application is a division of my application Serial No. 561,817, filed September 8, 1931, entitled "Cleaning fluid and process of manufacture."

This invention relates to cleaning fluid and the manufacture thereof by the chlorination of hydrocarbons, and more specifically to the chlorination of propane and/or halogen derivative thereof, and also to the chlorination of hydrocarbons in which propane and/or halogen derivatives thereof is or are present as a principal component or components.

The invention also relates to the products obtained, propane chlorides, particularly propane trichloride, and chlorinated hydrocarbon mixtures containing propane chlorides, particularly propane trichloride.

An object of the invention is to provide a process for the chlorination of propane, or of hydrocarbons in which propane is present in excess, in order to produce mixtures of propane chlorides, and specifically propane trichloride.

Another object is to provide a product containing propane trichloride which is highly efficient as a solvent for certain organic matter and as an agent for dry cleaning, the product consisting partly or entirely of propane trichloride.

Other objects and advantages of the invention will become apparent to those skilled in the art as the description proceeds.

Propane, either the commercial product, or hydrocarbons containing substantial percentages thereof, either in the liquid or gaseous state, or a low halogen derivative of propane, is subjected to the action of chlorine gas in standard types of apparatus adapted to chlorination processes, such as apparatus made of glass, preferably, but not necessarily, while exposed to sunlight or other forms of actinic rays.

The propane as a gas may be passed through glass vessels containing chlorine gas, or the chlorine gas may be passed through the vessels containing the propane gas, or the two gases may be passed together through the glass apparatus. The chlorination may be continued until the reaction is complete, or it may be conducted in a succession of stages with the recovery of the chlorinated products from the separate stages; for example, a part of the necessary quantity of chlorine may be admitted to the propane and permitted to react therewith, and then an additional quantity of chlorine added to react upon a further portion of the propane, and then a further quantity of chlorine added to complete the reaction, with the recovery of the chlorinated products at the intermediate stages if desired, or the recovery of the chlorinated products may be delayed until the reaction is complete.

The propane containing substance may be separately heated, or the chlorine may be separately heated, or the two reacting substances may be heated together. Preferably, the process is practiced by providing a series of glass reaction vessels of standard types, passing the propane continuously through all of the vessels, and admitting measured quantities of chlorine gas into each vessel. The latter process provides a satisfactory means for the regulation of the temperature and for obtaining the optimum conditions of reaction in each vessel. The evolved hydrochloric acid gas may be absorbed in any suitable manner, for example by water, or by other well-known methods, for example, refrigeration, etc. The excess of propane, or of lower propane chlorides, may be recovered and returned to the original body of propane for retreatment, or otherwise disposed of. The temperatures of the several reaction vessels may vary between about 50° C. for the first vessel, and about 400° C. for the final vessel. The reaction is preferably carried out in the presence of a suitable catalyst in each vessel, for example, a polyvalent metal chloride, such as cupric chloride, ferric chloride, antimony penta chloride, etc. The catalyst may be supported upon an inert carrier or it may be agitated and maintained in suspension by any suitable means, and is preferably maintained at a temperature of from 200° to 350.° C.

When liquefied propane is chlorinated, or liquefied propane and monochlorpropane, the operation is conducted under sufficient pressure to maintain the propane, or hydrocarbons containing the propane, in the liquid state. Ordinary propane may be liquefied under pressures of about 300 pounds per square inch at temperatures at which its chlorination is preferably effected.

When propane is chlorinated, the reactions are assumed to proceed as follows—

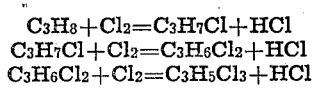

$$C_3H_8+Cl_2=C_3H_7Cl+HCl$$
$$C_3H_7Cl+Cl_2=C_3H_6Cl_2+HCl$$
$$C_3H_6Cl_2+Cl_2=C_3H_5Cl_3+HCl$$

After chlorination has taken place to the desired degree, the gaseous mixture obtained may be cooled and the desired constituents fractionally condensed and further purified as deemed necessary. The lesser chlorinated fractions may be returned to the chlorinating system at the appropriate point. Any exit gases, after scrubbing with water to remove hydrochloric acid, may be returned to the chlorinating system or otherwise disposed of.

When dichlorpropane is further chlorinated, the chlorine is passed through the boiling liquid, preferably, but not necessarily in the presence of actinic rays, such as sunlight; Thus—

7500 grams of 1.2 dichlorpropane (sp. g. 1.16) was boiled under a reflux condenser in sunlight, and chlorine passed through until the specific gravity reached 1.342 at 20° C.; the evolved hydrochloric acid gas being absorbed in water. The product was neutralized by thoroughly agitating with 25 grams of sodium carbonate, and then filtered. On fractional distillation, the following fractions were obtained—

(1) 750 grams 1.2 dichlorpropane containing some trichlorpropane, sp. g. 1.201.

(2) 8025 grams trichlorpropane (sp. g. 1.366) boiling range 120° C. to 161° C.

Fraction No. 1 may be returned to the system for further chlorination.

Fraction No. 2 is a product which may be used as a solvent, and is particularly effective as a dry cleaning agent in accordance with this invention.

The product is composed of a mixture of the isomeric trichlorpropanes and varying minor amounts of tetrachlorpropanes.

A typical specific gravity is 1.366 at about 20° C.
A typical boiling range is 120° C. to 160° C.
A typical chlorine content is from about 68% to about 75%.

This mixture is a clear, colorless liquid with a mild ethereal odor. It is much less toxic than carbon tetrachloride, and is a non-inflammable, and non-hazardous material. When used as a dry cleaning agent on celenese, and other fabrics, the solvent action or other action on the fabric is very small, much less than that with carbon tetrachloride, cleaner's naphtha, Stoddard solvent, or other cleaning agents in common use. It is less corrosive to metals in the presence of moisture than carbon tetrachloride.

The propane trichloride made as described herein may be used directly as a dry cleaning agent, or may be mixed with other dry cleaning solvents, such, for example, as petroleum naphthas or fractions boiling between 65° and 110° C.

Although I have described preferred embodiments of my invention, it will be understood that modifications may be made within the spirit and scope of the appended claims.

I claim:—

1. The process of making a trichlorpropane, which comprises treating a material containing a high percentage of propane and a carbon compound convertible into a trichlorpropane with chlorine in the presence of a chlorination catalyst under the influence of actinic rays, and in a plurality of stages at increasing temperatures.

2. The process of making a trichlorpropane, which comprises treating a material containing a high percentage of propane and a carbon compound convertible into a trichlorpropane with chlorine in the presence of a chlorination catalyst and under the influence of actinic rays, said process involving the continuous movement of at least one of the reacting materials.

3. The process of making a trichlorpropane, which comprises treating a material containing a high percentage of propane and a carbon compound convertible into a trichlorpropane with chlorine in the presence of a polyvalent metal chloride, the process being carried out at a temperature of above about 200° C.

4. The process of making a trichlorpropane, which comprises treating a material containing a high percentage of propane and a carbon compound convertible into a trichlorpropane with chlorine in the presence of cupric chloride.

5. The process of making a trichlorpropane, which comprises treating a material containing a high percentage of propane and a carbon compound convertible into a trichlorpropane with chlorine in the presence of cupric chloride, the process being carried out at a temperature of above about 200° C.

6. The process of making a trichlorpropane, which comprises treating a material containing a high percentage of propane and a carbon compound convertible into a trichlorpropane with chlorine in the presence of a polyvalent metal chloride and under the influence of actinic light, the process being carried out in several stages and at increasing temperatures beginning at about 50° C. for the first stage and up to 400° C. for the final stage, recovering the trichlorpropane and any higher propane chlorides produced, and further treating the less chlorinated residue of propane compounds.

7. The process of making a trichlorpropane, which comprises treating a material containing a high percentage of propane and a carbon compound convertible into a trichlorpropane with chlorine in the presence of cupric chloride and under the influence of actinic light, the process being carried out in several stages and at increasing temperatures beginning at about 50° C. for the first stage, and up to 400° C. for the final stage, recovering the trichlorpropane and any higher propane chlorides produced, and further treating the less chlorinated residue of propane compounds.

8. The process of making a trichlorpropane, which comprises treating a material containing a high percentage of propane and a carbon compound convertible into a trichlorpropane with chlorine in the presence of a polyvalent metal chloride and under the influence of actinic light, the process being carried out in several stages and at increasing temperatures beginning at about 50° C. for the first stage and up to 400° C. for the final stage, the propane-containing material being passed through all of the stages in succession, additional quantities of chlorine being admitted at the stages subsequent to the first.

9. The process of making a trichlorpropane, which comprises treating a material containing a high percentage of propane and a carbon compound convertible into a trichlorpropane with chlorine in the presence of cupric chloride and under the influence of actinic light, the process being carried out in several stages and at increasing temperatures beginning at about 50° C. for the first stage and up to 400° C. for the final stage, the propane-containing material being passed through all of the stages in succession, additional quantities of chlorine being admitted at the stages subsequent to the first.

10. The process of making a trichlorpropane, which comprises treating a material containing a high percentage of propane and a carbon compound convertible into a trichlorpropane with chlorine in the presence of cupric chloride maintained at a temperature of above about 200° C. and under the influence of actinic light, the process being carried out in several stages and at increasing temperatures beginning at about 50° C. for the first stage and up to 400° C. for the final stage.

11. The process of making a trichlorpropane, which comprises treating a liquefied material containing a high percentage of propane and a carbon compound convertible into a trichlorpropane with chlorine in the presence of cupric chloride and under the influence of actinic light, the process being carried out in several stages and at increasing temperatures beginning at about 50° C. for the first stage and up to 400° C. for the final stage.

12. A product derived from a raw material containing a high percentage of propane and other hydrocarbon compounds convertible into a trichlorpropane by chlorination which has a specific gravity of about 1.36, a boiling range of about 120° C. to 160° C. and a chlorine content of about 68° to about 75%.

13. A chlorinated product of a raw material containing a high percentage of propane and other hydrocarbon compounds convertible into a trichlorpropane having a specific gravity of approximately 1.36 and a boiling range of approximately 120° C. to 160° C. and having the probable formula

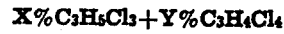

$$X\% C_3H_5Cl_3 + Y\% C_3H_4Cl_4$$

in which the sum of X and Y is approximately 100.

WILLIAM E. SHARP.